US006484400B1

(12) United States Patent
Motegi et al.

(10) Patent No.: US 6,484,400 B1
(45) Date of Patent: Nov. 26, 2002

(54) METHOD OF MANUFACTURING AN ORIFICE MEMBER

(75) Inventors: Akira Motegi, Yokosuka (JP); Yasuo Shibuya, Tokyo (JP); Ryoji Kaneko, Kawasaki (JP)

(73) Assignee: Tokyo Kikai Seisakusho, Ltd., Tokyo (JP)

( * ) Notice: Subject to any disclaimer, the term of this patent is extended or adjusted under 35 U.S.C. 154(b) by 0 days.

(21) Appl. No.: 09/426,006

(22) Filed: Oct. 25, 1999

Related U.S. Application Data

(62) Division of application No. 09/099,878, filed on Jun. 19, 1998.

(30) Foreign Application Priority Data

Oct. 7, 1997 (JP) ............................................. 9-289245

(51) Int. Cl.[7] ......................... B21D 53/76; B32B 31/00

(52) U.S. Cl. ..................... 29/890.1; 29/896.6; 156/252; 156/253; 156/306.6

(58) Field of Search ............................ 29/890.1, 896.6, 29/DIG. 1, 25.35, 830; 347/40, 44, 42, 73, 74, 76, 77, 75; 156/252, 253, 306.6; 219/121.7, 121.71

(56) References Cited

U.S. PATENT DOCUMENTS 4,138,687 A * 2/1979 Cha et al. ...................... 347/75
4,188,635 A * 2/1980 Giordano et al. ............. 347/75
4,210,920 A * 7/1980 Burnett et al. ................ 347/75
4,226,659 A * 10/1980 Griffith et al. .............. 156/253
4,663,208 A * 5/1987 Nimomiya et al. ......... 156/252
4,999,647 A * 3/1991 Wood et al. .................. 347/75
5,455,998 A * 10/1995 Miyazono et al. ..... 219/121.71
5,588,597 A * 12/1996 Reinecke et al. ............. 347/47

FOREIGN PATENT DOCUMENTS

| | | | | |
|---|---|---|---|---|
| JP | 1-264832 | * | 10/1989 | ............. 156/306.6 |
| JP | 2-102056 | * | 4/1990 | ................ 29/890.1 |
| JP | 4-504828 | | 8/1992 | |
| JP | 6-190307 | * | 7/1994 | ................ 29/890.1 |
| JP | 8-85212 | | 4/1996 | |
| JP | 9-99560 | | 4/1997 | |
| WO | WO-94/15746 | * | 7/1994 | ........... 219/121.71 |

* cited by examiner

*Primary Examiner*—Carl J. Arbes
*Assistant Examiner*—A. Dexter Tugbang
(74) *Attorney, Agent, or Firm*—Armstrong, Westerman & Hattori, LLP

(57) ABSTRACT

A method of manufacturing an orifice member used in a nozzle for ink-jet printing includes a first step of applying an adhesive onto one surface of a synthetic resin member; a second step of forming at least one through-opening in a metallic member such that the through-opening extends in a direction perpendicular to the direction of penetration of the through-opening; a third step of bonding together the metallic member having the through-opening and the synthetic resin member via the adhesive; and after the bonding step, a fourth step of forming a plurality of through-holes having substantially the same diameter in a portion of the synthetic resin member corresponding to the through-opening of the metallic member such that the through-holes are aligned at a substantially constant pitch along the through-opening of the metallic member and such that the through-holes do not deviate from an area corresponding to the through-opening.

3 Claims, 2 Drawing Sheets

METHOD OF MANUFACTURING AN ORIFICE MEMBER

This application is a division of prior application Ser. No. 09/099,878 filed Jun. 19, 1998.

BACKGROUND OF THE INVENTION

1. Field of the Invention

The present invention relates to a nozzle for ink-jet printing, an orifice member of the nozzle for ink-jet printing, and a method of manufacturing the orifice member of the nozzle for ink-jet printing. More particularly, the present invention relates to a nozzle for ink-jet printing in which a plurality of orifices are provided at a constant pitch in at least one row, an orifice member of such a nozzle for ink-jet printing, and a method of manufacturing such an orifice member of the nozzle for ink-jet printing.

2. Description of the Related Art

Conventionally, there has been known a nozzle for ink-jet printing in which a plurality of orifices are provided at a constant pitch in at least one row, as well as an orifice member for such a nozzle, an example of which is disclosed in PCT Kohyo Publication No. 4-504828. Also, there has been known a method of manufacturing such a nozzle and orifice member, an example of which is disclosed in Japanese Patent Application Laid-Open No. 9-99560.

The nozzle for ink-jet printing disclosed in PCT Kohyo Publication No. 4-504828 comprises a main body including a manifold portion formed to supply ink to a liquid-droplet discharge surface along the longitudinal direction of the main body; a plurality of piezoelectric strips attached to the main body; and an orifice member attached to the liquid-droplet discharge surface and having a row of orifices arranged along the longitudinal direction of the main body.

The orifice member of the nozzle is made of bright nickel or nickel alloy and is formed through electroforming. The orifice member is composed of a first layer for defining orifices and a second layer which reinforces the first layer to increase the strength of the orifice member and defines conduits (channels) each communicating with the corresponding orifice through an opening facing the opening of the corresponding orifice and having a diameter greater than that of the corresponding orifice. The open face of the second layer is bonded to the main body of the nozzle through use of epoxy adhesive having a large molecular weight.

In the orifice member of the nozzle for ink-jet printing disclosed in Japanese Patent Application Laid-Open No. 9-99560, a thin metallic member is laminated onto one or both surfaces of a synthetic resin member to form a laminate having increased mechanical and thermal stability; openings are formed in the thin metallic member by means of chemical etching; and holes (orifices) are formed to penetrate the synthetic resin member such that the holes open within the openings provided in the thin metallic member.

The method of manufacturing an orifice member disclosed in Japanese Patent Application Laid-Open No. 9-99560 comprises three steps. In the first step, a thin metallic member is laminated onto one or both surfaces of a synthetic resin member, in order to manufacture a laminate. In the second step, the thin metallic member forming the surface of the laminate is etched chemically to form holes at a relatively low degree of accuracy so that the synthetic resin member is exposed. In the third step, a plurality of through-holes having a predetermined diameter are formed in the exposed portion of the synthetic resin member by means of heat fusion such that the through-holes are aligned at a predetermined pitch.

In the nozzle for ink-jet printing disclosed in PCT Kohyo Publication No. 4-504828, ink fed to the manifold is jetted from the respective orifices in the form of straightly-advancing ink filaments, and the main body is vibrated by means of piezoelectric strips serving as vibrating elements in order to cut the ink filaments to an uniform length measured from the exits of the orifices, thereby forming ink droplets of a constant size.

However, in the nozzle for ink-jet printing disclosed in PCT Kohyo Publication No. 4-504828, since the orifices are formed through electroforming, the length of the orifices along the center line is not sufficient relative to the diameter of the orifices. Therefore, the ink fed to the orifices jets therefrom without assuming a clear laminar flow. In this case, since the state of the ink filaments jetted from the respective orifices is not stable, the ink filaments are difficult to cut to a uniform length measured from the exits of the orifices. Therefore, the size and traveling distance of ink droplets are not consistent making it difficult to obtain ink-jet printed material of high quality.

Moreover, since the orifice member of the nozzle for ink-jet printing disclosed in PCT Kohyo Publication No. 4-504828 is formed through electroforming as described above, the length of the orifices along the center line is not sufficient relative to the diameter of the orifices. Therefore, the ink fed to the orifices jets therefrom without assuming a clear laminar flow. Accordingly, even when the orifice member is employed for the nozzle for ink-jet printing, it is difficult to obtain ink-jet printed material of high quality.

The orifice member of the nozzle for ink-jet printing disclosed in Japanese Patent Application Laid-Open No. 9-99560 has overcome the drawbacks of the orifice member used in the nozzle for ink-jet printing disclosed in PCT Kohyo Publication No. 4-504828. That is, the orifice-forming layer of the orifice member is formed of a synthetic resin member having a desired thickness, and orifices are formed in the synthetic resin member through use of laser heat fusion such that the ratio of the axial length to the diameter becomes greater than 1. Thus, the ink passing through the orifices is caused to assume a laminar flow.

However, in the orifice member of the nozzle for ink-jet printing disclosed in Japanese Patent Application Laid-Open No. 9-99560, the surface of the synthetic resin member is covered with the thin metallic member in order to obtain mechanical stability and thermal stability, and chemical etching is performed to partially remove the thin metallic member at positions where orifices are to be formed. Thus, openings are formed at the positions corresponding to the orifices. However, since the metallic member is extremely thin, irregular side etching (corrosion in the lateral direction) occurs easily, and therefore the shape and accuracy of the openings vary. Therefore, in a nozzle for ink-jet printing employing the orifice member, the flow of ink supplied from the manifold into the orifices becomes turbulent after having reached the openings of the thin metallic member, and ink flows turbulently into the orifices. Therefore, there exists a possibility that the ink passing through the orifices does not assume a laminar flow.

Further, since the nozzles (holes) of the synthetic resin member are formed through material removal utilizing laser fusion; i.e., heat fusion by means of infrared laser, burrs or irregular protrusions are formed at the edge portions of the openings. This cause the problems of turbulent flow of ink and deflection of the jetting direction of ink.

Therefore, when the orifice member is used in a nozzle for ink-jet printing, the size of ink droplets and the traveling distance and direction of ink droplets sometimes become inconsistent, making it difficult to obtain ink-jet printed material of high quality. Accordingly, the nozzle does not operate stably as a nozzle for ink-jet printing Further, in the method of manufacturing an orifice member disclosed in Japanese Patent Application Laid-Open No. 9-99560, as already described, side etching occurs during the step of chemically etching the thin metallic member at the surface of the laminate. Therefore, desired finish cannot be obtained. In addition, since the nozzles (holes) of the synthetic resin member are formed by use of infrared laser, it is impossible to prevent the generation of burrs and irregular protrusions at the edge portions of the openings stemming from heat fusion.

That is, it is difficult to manufacture an orifice member that has a desired shape and accuracy and thus has a well-stabilized performance.

SUMMARY OF THE INVENTION

An object of the present invention is to solve the above-mentioned problems in the conventional techniques and to provide a nozzle for ink-jet printing which enables ink filaments jetted from orifices to be cut to a uniform length measured from the exits of the orifices, thereby enabling production of high quality printed material through ink-jet printing.

Another object of the present invention is to provide an orifice member having a plurality of orifices and used in a nozzle for ink-jet printing, which orifice member allows ink filaments jetted from the orifices to be cut to a uniform length measured from the exits of the orifices.

Still another object of the present invention is to provide a manufacturing method for stably manufacturing the orifice member to a high degree of accuracy and precision.

A nozzle for ink-jet printing according to the present invention comprises: a manifold having an outside surface extending in the longitudinal direction of the manifold as well as a hollow space, the hollow space having a opening opened in the outside surface such that the opening extends along the longitudinal direction while maintaining a substantially constant width; a vibrating element attached to at least one outside surface other than the outside surface in which the hollow space is opened; and an orifice member brought into contact and attached to the outside surface in which the hollow space is opened.

The orifice member is composed of a metallic member provided in contact with the manifold, and a synthetic resin member bonded to the metallic member through use of adhesive. The metallic member has at least one through-opening at a position facing the opening of the hollow space of the manifold such that the through-opening communicates with the opening of the hollow space. The synthetic resin member has a plurality of through-holes having substantially the same diameter formed to face the through-opening. The through-holes are aligned at a substantially constant pitch along the through-opening of the metallic member such that they do not deviate from an area corresponding to the through-opening of the metallic member.

An orifice member used in a nozzle for ink-jet printing according to the present invention is composed of a metallic member and a synthetic resin member bonded to the metallic member through use of adhesive. The metallic member has at least one through-opening that extends in a direction perpendicular to the direction of penetration of the through-opening. The synthetic resin member has a plurality of through-holes which have substantially the same diameter not greater than the size of the through-opening of the metallic member and are aligned at a substantially constant pitch in a direction perpendicular to the direction of penetration of the through-holes. The opening of each through-hole faces the through-opening of the metallic member and does not deviate from an area corresponding to the through-opening.

A method of manufacturing an orifice member used in a nozzle for ink-jet printing comprises:

- a first step of applying an adhesive onto one surface of a synthetic resin member;
- a second step of forming at least one through-opening in the metallic member such that the through-opening extends in a direction perpendicular to the direction of penetration of the through-opening;
- a third step of bonding together the metallic member having the through-opening and the synthetic resin member via the adhesive; and
- a fourth step of forming a plurality of through-holes having substantially the same diameter in a portion of the synthetic resin member corresponding to the through-opening of the metallic member such that the through-holes are aligned at a substantially constant pitch along the through-opening of the metallic member and such that the through-holes do not deviate from an area corresponding to the through-opening.

Preferably, the through-holes of the synthetic resin member are formed through cutting of molecular coupling of the synthetic resin member by means of photon energy. In this case, a UV laser is preferably used as a source of photon energy.

The nozzle for ink-jet printing according to the present invention enables ink filaments having substantially the same diameter to be jetted straight in a predetermined direction. Therefore, it becomes possible to cut the ink filaments to a uniform length measured from the exits of the orifices, thereby forming ink droplets having a constant size, which ink droplets travel a desired distance in a desired direction. Thus, high quality printed material can be produced through ink-jet printing.

Further, the manufacturing method of the present invention enables accurate and stable formation of fine holes that have an axial length sufficiently greater than the diameter.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

A nozzle for ink-jet printing according to an embodiment of the present invention will now be described with reference to the drawings. The expression "vertical direction" used in the following description means the vertical direction in FIG. 2.

Figure 1:
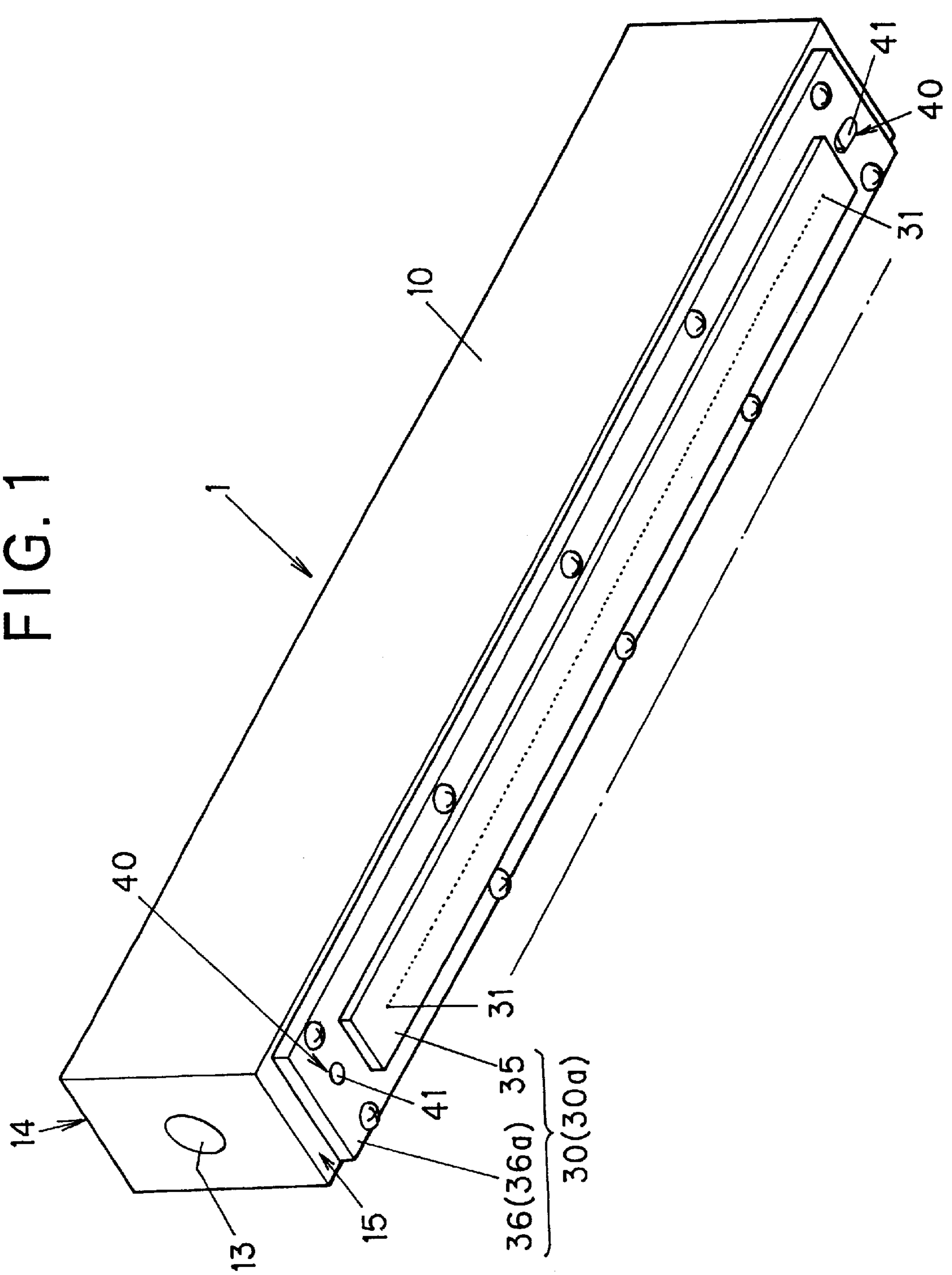
FIG. 1 is a perspective view of a nozzle for ink-jet printing according to an embodiment of the present invention as viewed from the lower side of the nozzle.
Figure 2:
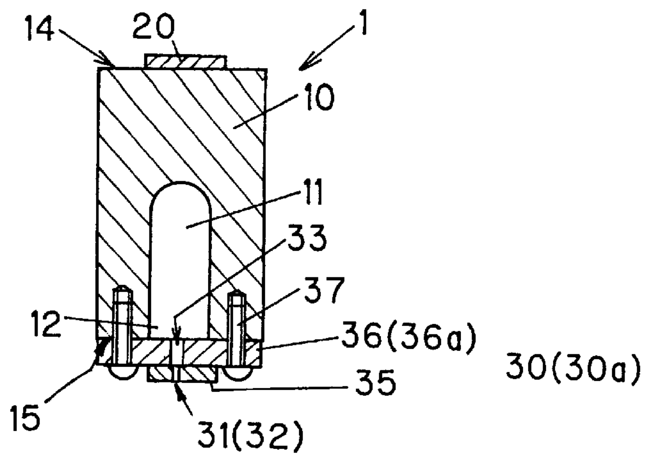
FIG. 2 is a transversal, cross-sectional view of the nozzle for ink-jet printing shown in FIG. 1.

As shown in FIGS. 1 and 2, the nozzle for ink-jet printing 1 comprises a manifold 10, a vibrating element 20, and an orifice member 30. The manifold 10 has an elongated rectangular-parallelepiped shape. The vibrating element 20 is attached to an outside surface of the manifold 10 (to an upper surface 14 in the illustrated example) such that the vibrating element 20 extends in the longitudinal direction of the manifold 10. Through supply of an appropriate amount of electrical, mechanical, or fluid energy, the vibrating element 20 regularly operates to vibrate the manifold 10. The orifice member 30 is attached to the lower surface 15 of the manifold 10 such that the orifice member 30 extends in the longitudinal direction. The orifice member 30 has a plurality of orifices 31 for jetting ink aligned in the longitudinal direction.

The manifold 10 is formed of, for example, steel. In the manifold 10 is formed a hollow space 11 having an opening 12 in the outside surface (in the lower surface 15 in the illustrated example). The opening 12 extends in the longitudinal direction while maintaining a substantially constant width. In addition to the opening 12, at least one ink-reception opening 13 that communicates with the hollow space 11 is formed in, for example, one end surface of the manifold 10.

In the illustrated embodiment, the width of the opening 12 is the same as that of the hollow space 11. However, the opening 12 may have a width different from that of the hollow space 11, e.g. a width smaller than that of the hollow space 11.

Figure 5:
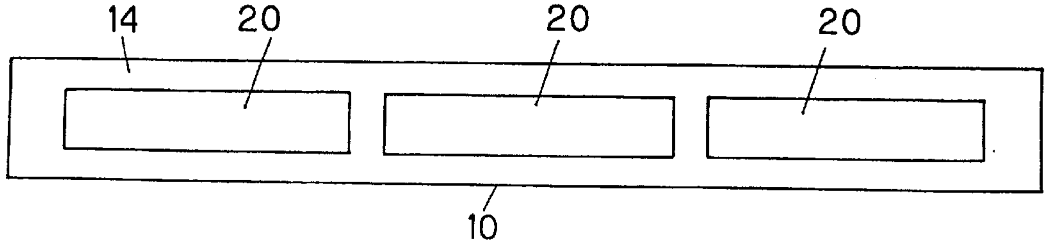
FIG. 5 is a top view of the nozzle for ink-jet printing shown in FIG. 1.

The vibrating element 20 is, for example, a piezoelectric element that expands and contracts in response to intermittently supplied positive voltage. The vibrating element 20 is attached to an outside surface of the manifold 10 other than the lower surface 15. For example, the vibrating element 20 is brought into close contact with and attached to the upper surface of the manifold at one or more locations. In an actual nozzle, as shown in FIG. 5, the vibrating element 20 is attached to the upper surface of the manifold at three locations. When positive voltage is intermittently supplied at predetermined intervals to the vibrating element 20 via an unillustrated driver circuit, the vibrating element 20 expands and contracts to vibrate the manifold 10.

The orifice member 30 is composed of a metallic member 36 serving as an auxiliary member, and a synthetic resin member 35 having the plurality of orifices 31.

The metallic member 36 serving as an auxiliary member has positioning holes 40 formed at, for example, opposite ends of the metallic member 36. Also, positioning pins 41 are provided on the attachment surface of the manifold 10. The orifice member 30 is placed onto the attachment surface of the manifold 10 such that the positioning pins 41 are received by the positioning holes 40. Subsequently, the peripheral edge portion of the orifice member 30 is fixed to the manifold 10 by use of attachment screws 37. Thus, the orifice member 30 is positioned at a predetermined position and is attached to the attachment surface of the manifold 10.

In place of the attachment screws 37, adhesive may be used to attach the orifice member 30 to the attachment surface of the manifold 10 in order to establish uniform close contact therebetween. Further, both adhesive and attachment screws may be used to attach the orifice member 30 to the manifold 10.

Figure 3:
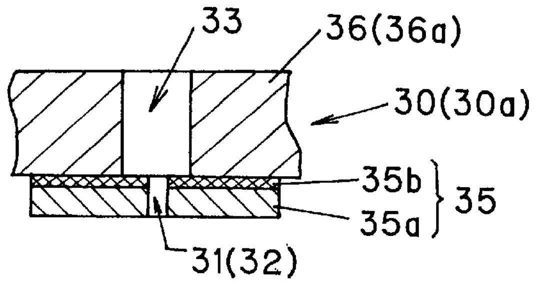
FIG. 3 is a cross-sectional view of an orifice member of the nozzle for ink-jet printing shown in FIG. 1.

In the orifice member 30*a* shown in FIGS. 1–3, the metallic member 36 is formed of, for example, an elongated steel plate 36*a* and has a slit 33 that has a width of, for example, 1 mm and that extends along the longitudinal direction. The slit 33 serves as a through-opening that penetrates the metallic member 36 in the thicknesswise direction.

The synthetic resin member 35 is a laminar plate composed of a substrate 35*a* formed of polyimide resin and an adhesive layer 35*b* formed of a thermosetting resin adhesive and superposed on the substrate 35*a*. The synthetic resin member 35 is bonded to one surface of the steel plate 36*a*.

A plurality of fine holes 32 are formed in the synthetic resin member 35 at a substantially constant pitch and in a row. Although in the illustrated example the fine holes 32 are formed in a single row, the fine holes 32 may be formed in a plurality of rows. The fine holes 32 are formed such that they penetrate the synthetic resin member 35 in the thicknesswise direction thereof and do not deviate from the opening of the slit 33 of the steel plate 36*a*. The fine holes 32 communicate with the slit 33 via openings whose diameter is smaller than the thickness of the synthetic resin member 35, and thus form orifices 31.

Figure 4:
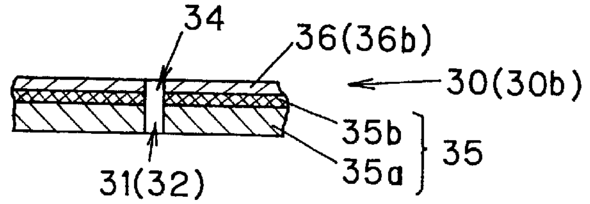
FIG. 4 is a cross-sectional view of another orifice member having a structure different from that of the orifice member shown in FIG. 3.

In an orifice member 30*b* according to an embodiment shown in FIG. 4, the metallic member 36 is formed of, for example, an elongated thin nickel plate 36*b*. A plurality of fine holes 34 are formed in the thin nickel plate 36*b* at a substantially constant pitch in the longitudinal direction to form a row of fine holes. The fine holes 34 serve as a through-opening that penetrates the thin nickel plate 36*b* in the thicknesswise direction and that has a diameter greater than the thickness of the thin nickel plate 36*b*. Although in the illustrated example the fine holes 34 are formed in a single row, the fine holes 34 may be formed in a plurality of rows.

The synthetic resin member 35 has a structure identical with that of the embodiment shown in FIGS. 1–3. The synthetic resin member 35 is bonded to one surface of the thin nickel plate 36*b* such that the synthetic resin 35 closes one opening of each fine hole 34 of the thin nickel plate 36*b*.

Further, a plurality of fine holes 32 are formed in the synthetic resin member 35 such that they are aligned with and communicate with the fine holes 34 of the thin nickel plate 36*b*. Thus., the fine holes 32 of the synthetic plate 35 and the fine holes 34 of the thin nickel plate 36*b* form the orifices 31.

In each of the orifice member 30*a* shown in FIGS. 1–3 and the orifice member 30*b* shown in FIG. 4, each of the orifices 31 is formed such that its axial length becomes equal to or greater than 1.5 times the diameter thereof.

Next, a description will be given of action of the above-described nozzle for ink-jet printing and the orifice member 30 therefor.

When slightly pressurized ink from an unillustrated ink supply source is supplied to the nozzle 1 for ink-jet printing, the ink is fed to the hollow space 11 of the manifold 10 via the ink reception opening 13 and fills the hollow space 11.

The ink charged in the hollow space 11 flows from the opening 12 of the hollow space 11 and reaches the fine holes 32; i.e., the orifices 31 via the slit 33 or the fine holes 34 of the orifice member 30 (30*a* or 30*b*) serving as a through-opening. The ink is then jetted from the orifices 31 in the form of thin ink filaments.

Since the axial length of the orifices 31 is equal to or greater than 1.5 times the diameter of the orifices 31, the ink passes the orifices 31 while assuming a laminar flow and jets from the orifices in the form of straightly advancing ink filaments having a substantially uniform diameter and a substantially constant length.

When positive voltage is intermittently supplied at predetermined intervals via an unillustrated driver circuit to the piezoelectric element serving as the vibrating element 20, the piezoelectric element expands and contracts to vibrate the manifold 10. The frequency of vibration of the manifold 10 caused by the piezoelectric element is determined depending on the predetermined intervals at which the positive voltage is intermittently supplied.

The vibration of the manifold 10 is transmitted to the orifice member 30, which is fixed to the manifold 10 in a contacting state, so that the ink filaments injected from the orifice 31 are vibrated.

The vibrated ink filaments advance straightly, and are cut to substantially the same length as measured from the exits of the orifices 31. Thus, due to surface tension, the ink filaments become ink droplets having substantially the same diameter and fly in the advancing direction.

In an actual ink-jet printing operation, some of the ink droplets that are not needed to form images are selectively charged to change their flying path for collection thereof, while the ink droplets needed to form images are allowed to fly straight toward a material to be printed. Since this technique is not directly related to the present invention, the description hereof will be omitted.

Next, the method of manufacturing the orifice member 30 of the nozzle for ink-jet printing according to the embodiment of the present invention will be described.

When the orifice member 30 shown in FIGS. 1–3 is to be manufactured, through use of a coater a thin layer of the thermosetting resin adhesive 35*b* is first formed on one surface of the thin-plate shaped substrate 35*a* formed of polyimide resin. The layer of the adhesive 35*b* is formed such that the thickness of the layer falls within the range of 1/100 to 5/100 millimeter. After the layer of the adhesive 35*b* becomes stable, the substrate 35*a* is cut to a desired shape of a desired dimension in order to obtain the synthetic resin member 35.

Subsequently, steel plate is machined in a desired shape, and the slit 33 serving as the through-opening is formed by, for example, electrical discharge machining such that the slit 33 extends along the longitudinal direction. Finally, the steel plate is finished into the metallic member 36 having a desired shape; i.e., the steel plate 36*a*.

Subsequently, the steel plate 36*a* and the synthetic resin member 35 are superposed on each other such that the synthetic resin member 35 closes one opening of the slit 33 of the steel plate 36*a* and the layer of the adhesive 35*b* is in contact with the steel plate 36*a*. The steel plate 36*a* and the synthetic resin member 35 are heated, while pressure is applied to the steel plate 36*a* and the synthetic resin member 35 in their superposition direction. Subsequently, the steel plate 36*a* and the synthetic resin member 35 are left for a predetermined period of time or more, if needed, in order to complete bonding therebetween.

Further, there is performed laser machining in which a beam of eximer laser is radiated onto the synthetic resin member 35 from the side where the slit 33 of the steel plate 36*a* exists or where the adhesive 35*b* exists, in order to form the plurality of fine holes 32 (i.e., orifices 31) in the synthetic resin member 35 at a substantially constant, small pitch such that the fine holes 32 penetrate the synthetic resin member 35 in the thicknesswise direction thereof and are aligned along the slit 33 of the steel plate 36*a*.

Unlike the $CO_2$ laser and the YAG laser, which are infrared light (i.e., heat rays), the eximer laser is UV light and therefore has a very high photon energy. Therefore, even when the synthetic resin member 35 formed of a polymer material is irradiated with the eximer laser, the synthetic resin member 35 does not generate heat. Instead, the molecular coupling is instantaneously cut by means of high photon energy at a portion irradiated with the laser.

As in the case where the fine holes 32 are formed through use of a $CO_2$ laser or a YAG laser, the thus-formed fine holes have a taper shape in which the opening on the upstream side with respect to the radiation direction of the laser (i.e., the side where the adhesive 35*b* exists) has a diameter slightly larger than that of the opening on the downstream side (i.e., the side where the substrate 35*a* exists). However, since generation of burrs and irregular protrusions at the edge portions of the openings is prevented, the fine holes 32 can be accurately formed into a desired shape such that the axial length becomes larger than the diameter.

Moreover, since the laser is radiated onto the synthetic resin member 35 through the slit 33, the fine holes 32 or orifices 31 can be formed in such a manner that they do not deviate from the opening of the slit 33 (i.e., the through-opening of the steel plate 36*a*). In this manner, the orifice member 30*a* shown in FIGS. 1–3 is manufactured.

The orifice member 30*b* shown in FIG. 4 is manufactured in accordance with the following manufacturing method.

As in the method of manufacturing the orifice member 30*a* shown in FIGS. 1–3, through use of a coater a thin layer of the thermosetting resin adhesive 35*b* is first formed on one surface of the thin-plate shaped substrate 35*a* formed of polyimide resin. The layer of the adhesive 35*b* is formed such that the thickness of the layer falls within the range of 1/100 to 5/100 millimeter. After the layer of the adhesive 35*b* becomes stable, the substrate 35*a* is cut to a desired shape of a desired dimension in order to obtain the synthetic resin member 35.

Subsequently, electroforming is performed to form an elongated thin nickel plate (i.e., metallic plate) 36*b* having fine holds 34 of a desired diameter which are aligned at a desired pitch and which serves as through-opening.

Subsequently, the thin metallic plate 36*b* and the synthetic resin member 35 are superposed on each other such that the synthetic resin member 35 closes one opening of each fine hole 34 of the thin metallic plate 36*b* and the layer of the adhesive 35*b* is in contact with the thin metallic plate 36*b*. The thin metallic plate 36*b* and the synthetic resin member 35 are heated, while pressure is applied to the thin metallic plate 36*b* and the synthetic resin member 35 in their superposition direction. Subsequently, the thin metallic plate 36*b* and the synthetic resin member 35 are left for a predetermined period of time or more, if needed, in order to complete bonding therebetween.

Further, there is performed laser machining in which a beam of eximer laser is radiated onto the synthetic resin member 35 from the side where the fine holds 34 of the thin metallic plate 36*b* exists or where the adhesive 35*b* exists, in order to form the plurality of fine holes 32 (i.e., orifices 31) in the synthetic resin member 35 such that the fine holes 32 penetrate the synthetic resin member 35 in the thicknesswise direction thereof.

That is, since the thin metallic plate 36*b* serving as the metallic member 36 has no molecular coupling structure unlike the synthetic resin member 35, which is polymer material, the molecular coupling of the thin metallic plate 36*b* is not cut through irradiation of the eximer laser. Accordingly, the fine holes 32 can be formed in the synthetic resin member 35 by radiating the eximer laser onto portions of the synthetic resin member 35 corresponding to the fine holes 34 of the thin metallic plate 36*b* while using the thin metallic plate 36*b* as a masking member.

As a result, the opening of each fine holes 34 of the thin metallic plate 36*b* has the same position and diameter of the opening of the corresponding fine hole 32 of the synthetic resin member 35 adjacent thereto. Therefore, each fine hole 34 of the thin metal plate 36*b* and the corresponding fine hole 32 of the synthetic resin member 35 form a single continuous fine hole serving as an orifice.

The formation of the fine holes in the synthetic resin member 35 through use of the eximer laser is performed in the manner identical to that for the orifice member 30*a* shown in FIGS. 1–3. In this manner, the orifice member 30*b* shown in FIG. 4 is manufactured.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of manufacturing an orifice member used in a nozzle for ink-jet printing comprising:

a first step of applying an adhesive onto one surface of a synthetic resin member;

a second step of forming at least one through-opening in a metallic member such that the through-opening extends in a direction perpendicular to the direction of penetration of the through-opening;

a third step of bonding together said metallic member having the through-opening and said synthetic resin member via the adhesive; and after the bonding step, a fourth step of forming a plurality of through-holes having substantially the same diameter in a portion of said synthetic resin member corresponding to the through-opening of said metallic member such that the through-holes are aligned at a substantially constant pitch along the through-opening of said metallic member and such that the through-holes do not deviate from an area corresponding to the through-opening.

2. A method of manufacturing an orifice member of a nozzle for ink-jet printing according to claim 1, wherein the through-holes of said synthetic resin member are formed through cutting of molecular coupling of said synthetic resin member by means of photon energy.

3. A method of manufacturing an orifice member of a nozzle for ink-get printing according to claim 2, wherein a UV laser is used as a source of photon energy.

* * * * *